US011342748B2

(12) United States Patent
Datka et al.

(10) Patent No.: US 11,342,748 B2
(45) Date of Patent: May 24, 2022

(54) DYNAMIC VOLTAGE AND REACTIVE POWER CONTROLLER FOR NON-SYNCHRONOUS POWER GENERATION PLANTS

(71) Applicant: GENERAL ELECTRIC COMPANY, Schenectady, NY (US)

(72) Inventors: Paul Joseph Datka, Schenectady, NY (US); Hongbiao Song, Houston, TX (US); John Douglas McDonald, Norcross, GA (US); Viswanath Kunapuli, Schenectady, NY (US); Alfredo Sebastian Achilles, Niskayuna, NY (US); Naresh Acharya, Niskayuna, NY (US); Yingying Wang, Schenectady, NY (US)

(73) Assignee: General Electric Technology GmbH, Baden (CH)

( * ) Notice: Subject to any disclaimer, the term of this patent is extended or adjusted under 35 U.S.C. 154(b) by 13 days.

(21) Appl. No.: 17/016,370

(22) Filed: Sep. 9, 2020

(65) Prior Publication Data
US 2022/0077683 A1    Mar. 10, 2022

(51) Int. Cl.
*H02J 3/18*    (2006.01)
*H02J 3/38*    (2006.01)

(52) U.S. Cl.
CPC ............... *H02J 3/18* (2013.01); *H02J 3/381* (2013.01); *H02J 2300/28* (2020.01); *H02J 2310/18* (2020.01)

(58) Field of Classification Search
CPC .......... H02J 3/18; H02J 3/381; H02J 2300/28; H02J 2310/18; H02J 3/20; H02J 3/16;
(Continued)

(56) References Cited

U.S. PATENT DOCUMENTS

2011/0264289 A1* 10/2011 Sawyer ................... H02J 3/383
700/287
2013/0106196 A1* 5/2013 Johnson ................ H02J 3/1842
307/82

(Continued)

FOREIGN PATENT DOCUMENTS

EP       3216099 B1    12/2018

*Primary Examiner* — Lincoln D Donovan
*Assistant Examiner* — Alex W Lam
(74) *Attorney, Agent, or Firm* — Eversheds Sutherland (US) LLP

(57) ABSTRACT

Systems and methods for improved anomaly detection for rotating machines. An example method may include determining that power generation is to be performed based on a voltage instead of a power factor; receiving a command voltage; receiving a measured voltage value from a first location in a power generation network; determining that the measured voltage value from the first location is less than the command voltage value; determining that a current value associated with a transmission line at the third location is less than a threshold current value; determining that a reactive power of a power generation component at a third location is less than a maximum reactive power of the component; and increasing, based on the determination that the reactive power of the component at the third location is less than a maximum reactive power of the component, the reactive power of the component.

20 Claims, 7 Drawing Sheets

(58) Field of Classification Search
CPC ...... H02J 3/1842; H02J 3/1821; H02J 3/1828; H02J 3/1885; H02J 3/1864; H02J 3/1814; H02J 3/1892; H02J 3/1871; H02J 3/1835; H02J 3/38; H02J 3/1878; G05F 1/70
See application file for complete search history.

(56) References Cited

U.S. PATENT DOCUMENTS

| | | | |
|---|---|---|---|
| 2013/0234521 A1* | 9/2013 | Eom | H02J 3/1821 307/66 |
| 2015/0102674 A1* | 4/2015 | Rudolph | H02J 3/46 307/52 |
| 2016/0237990 A1* | 8/2016 | Ubben | H02J 3/50 |

* cited by examiner

US 11,342,748 B2

DYNAMIC VOLTAGE AND REACTIVE POWER CONTROLLER FOR NON-SYNCHRONOUS POWER GENERATION PLANTS

TECHNICAL FIELD

The present disclosure relates to power generation systems. In some embodiments, the present disclosure may more particularly relate to reactive power generation in wind farm and non-synchronous power generation plants.

BACKGROUND

Wind plants and other non-synchronous power plants may generally be required to have dynamic reactive power capability to meet a power factor and/or voltage requirements at a Point of Interconnection (POI) within a power generation network, also known as a power grid. The POI is defined based on the Interconnection Agreement with the electric utility. Thus, the power plants may need to control a voltage or a power factor at the POI. In some cases, this may be accomplished by injecting reactive power into the power grid or absorbing reactive power from the power grid. In some cases, injecting and/or absorbing reactive power may be performed using wind turbines within a wind power generation plant. However, the capabilities of the wind turbines and/or the transmission lines associated with the wind turbines may be limited, so supplemental power may be provided by static and dynamic reactive power compensation equipment such as shunt reactors, capacitor banks, static var compensators (SVC), static synchronous compensators (STATCOM), and/or synchronous condensers.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
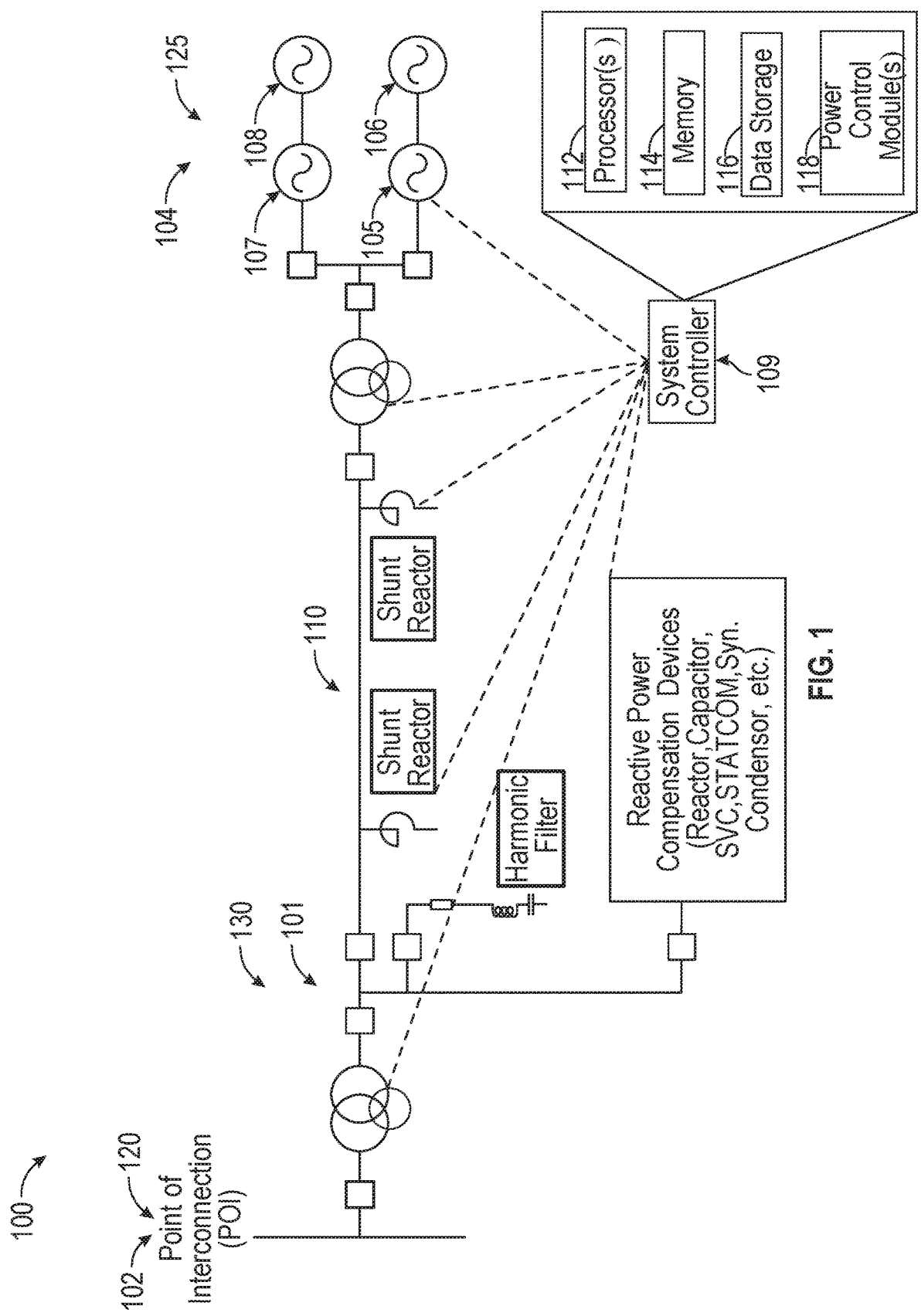
FIG. 1 depicts example system, in accordance with one or more example embodiments of the disclosure.

In some embodiments, the disclosure is directed to a dynamic voltage and reactive power controller for non-synchronous power generation plants. More particularly, the disclosure may be directed to the integration of multiple different power generation sources, such as offshore power generation sources (for example, wind power generation sources (for example, wind power generation plants, also known as wind farms), and onshore power substations (for example, electrical substations) to reduce control functionality usage and achieve a more optimized method of producing a desired voltage and/or reactive power at a Point of Interconnection (POI) in a power generation network. This method may include at least using a controller that manages power generation components at multiple locations (for example, wind turbines at offshore power generation locations and electrical substations at onshore and offshore power generation locations) to minimize the necessity for more expensive reactive power compensation equipment to provide sufficient voltage and/or reactive power to the POI. This overall integrated system using the controller may reduce costs and the overall footprint of the systems described herein by eliminating the need for certain expensive reactive power compensation equipment. The system may also reduce electrical power losses in the electrical network from the wind farm to the POI. Further, the system may also allow for wind turbine generators and electrical substations to be utilized as a complete package. In conventional systems, these may be controlled separately, which may result in duplication of functionality. Therefore, in certain embodiments of the disclosure, various systems and methods can optimize dynamic voltage and reactive power compensation in a power generation network. Further, certain technical effects of the disclosure can optimize dynamic voltage and reactive power compensation in a power generation network.

In some embodiments, the dynamic voltage and reactive power control systems and methods described herein may be performed as follows. Such systems and methods may include a controller, which may acquire certain system electrical quantities (for example, measured data) as inputs. In some instances, the electrical quantities may include active and reactive power injected into the POI ($P_{poi}$ and $Q_{poi}$) or a voltage at POI ($V_{poi}$), voltage and current at various points along a transmission cable, and/or the reactive power output and terminal voltage of power generation units, among other electrical quantities. The controller may then receive a voltage or power factor command and may enter into voltage control mode or power factor control mode based on whether the controller received a voltage command or a power factor command. Utilities in certain geographic areas may require either control based on power factor or voltage, so whether a voltage command or a power factor command is received may depend on the power system operator's requirements. In the power factor control mode, the controller may generate a required POI reactive power command ($Q_{poi,cmd}$) based on a received power factor setpoint and may control the reactive power output of power generation components at a first power generation source (for example, the offshore power generation source) and power generation components at a second power generation source (for example, the onshore reactive power compensation source) to meet the reactive power needs at the POI. The controller may prioritize the utilization of the reactive power capability from the power generation components at the first power generation source and may utilize the power generation components at the second power generation source when the power generation components at the first power generation source reach their reactive capability limits, or the transmission cable power flow reaches, for example, a thermal limit (or other limit). In the power factor control mode, the controller may compare the measure reactive power injection at the POI ($Q_{poi}$) with $Q_{poi,cmd}$. If $Q_{poi}$ is determined to be less than $Q_{poi,cmd}$, the controller may work to bring $Q_{poi}$ closer to $Q_{poi,cmd}$ by increasing reactive power of power generation components at the first power generation source ($Q_{gen}$) and the supplemental reactive power provided by the power generation components at the second power generation source ($Q_{comp}$). If $Q_{poi}$ is determined to be greater than $Q_{poi,cmd}$, the controller may decrease $Q_{gen}$ and $Q_{comp}$ to meet the $Q_{poi,cmd}$ at the POI. More particularly, when $Q_{poi}$ is determined to be less than $Q_{poi,cmd}$, the controller may first determine whether the transmission cable thermal limits have been reached. In some instances, the transmission cable may be a transmission cable associated with the power generation components at the first power generation source. However, the transmission cable may also be a transmission cable associated with any other portion of the power generation network as well. If the thermal limits have not been reached, the controller may increase $Q_{gen}$ if power generation components at the first power generation source have available capability to produce additional reactive power. If the power generation components at the first power generation source have reached their reactive power limit or the thermal limits of the transmission cable have been reached, the controller may increase the reactive power of the power generation components at the second power generation source. When $Q_{poi}$ is greater than $Q_{poi,cmd}$, the controller may work to decrease $Q_{poi}$. The controller may first determine whether the transmission cable thermal limits have been reached. If the thermal limits have not been reached, the controller may decrease $Q_{gen}$ if power generation components at a first power generation source have available capability to reduce additional reactive power. When the power generation components at a first power generation source have reached their reactive power limit or the thermal limits of the transmission cable have been reached, the controller may decrease the output of the power generation components at the second power generation source to meet the $Q_{poi,cmd}$, and provide the appropriate reactive power at the POI.

In the voltage control mode, the controller may control the reactive power output of the power generation components at the first power generation source and the power generation components at the second power generation source to meet the POI voltage setpoint. In voltage control mode, the controller may similarly prioritize the utilization of the power generation components at the first power generation source and utilize the power generation components at the second power generation source when the power generation components at the first power generation source reach their reactive capability limits, or the transmission cable power flow reaches its thermal limits. In the voltage control mode, the controller may compare the measure voltage at the POI ($V_{poi}$) with $V_{poi,cmd}$. If it is determined that $V_{poi}$ is less than $V_{poi,cmd}$, the controller may work to increase reactive power from the power generation components at the first and second power generation source, by increasing $Q_{gen}$ and $Q_{comp}$. When $V_{poi}$ is determined to be greater than $V_{poi,cmd}$, the controller may decrease $Q_{gen}$ and $Q_{comp}$ to lower the POI voltage and meet the setpoint. More particularly, when $V_{poi}$ is determined to be less than $V_{poi,cmd}$, the controller may first determine whether the transmission cable thermal limits have been reached. If the thermal limits have not been reached, the controller may increase $Q_{gen}$ if power generation components at the first power generation source have available capability to produce additional reactive power. If the power generation components at the first power generation source have reached their reactive power limit or the thermal limits of the transmission cable have been reached, the controller may increase power generation components at the second power generation source. When $V_{poi}$ is determined to be greater than $V_{poi,cmd}$, the controller may instead work to decrease $Q_{poi}$. The controller may first determine whether the cable thermal limits have been reached. If the thermal limits have not been reached, controller may decrease $Q_{poi}$ when power generation components at the first power generation source have available capability. When the power generation components at the first power generation source have reached their reactive power limit or the thermal limits of the transmission cable have been reached, the controller may decrease the output of the power generation components at the second power generation source to meet the $Q_{poi,cmd}$. In some cases, increasing Q may be equivalent to the mathematical representation of $Q_{new}=Q_{old}+Q_{step}$ ($Q_{step}>0$). For instance, Q>0 may represent reactive power being injected into the power generation network. Hence, increasing Q may refer injecting more reactive power into the power generation network. Whereas, Q<0 represents reactive power may be absorbed from the power generation network. Hence, increase Q may refer to absorbing less reactive power from the power generation network.

In some embodiments, the determinations by a controller, or other component in power generation network, as to when supplemental reactive power or voltage should be provided by the power generation components at the second power generation source, may also be performed preemptively as well. For example, instead of waiting for the limits of the power generation components at the first power generation source and/or the limits of the transmission cables to be reached, a prediction may be made by, for example, a controller, or other component in the power generation network, that these limits may eventually be reached, and then the controller may prompt the power generation components at the second power generation source to begin producing supplemental reactive power or voltage even before the limits are reached. This preemptive action may be based on, for example, another threshold value, a deadband, and other predictive methods, such as machine learning.

Illustrative Systems

Turning to the figures, FIG. 1 depicts an example system 100, in accordance with one or more example embodiments of the disclosure. The system 100 may include at least a Point of Interconnection (POI) 102, a first power generation source 104, a second power generation source 101, a transmission line 110, and a controller 109.

In some embodiments, the Point of Interconnection (POI) 102 may generally refer to an interface point in an electric network where two portions of a network, or where the network and a sub-system to the network, may be connected together, such as at an Electrical Substation. The point of Interconnection (POI) 102 may be located at a location 120 (which may be, for example, a first location) in the system 100, such as the interconnection transformer high voltage (HV) terminal or interconnection breaker HV terminal based on a specific Interconnection Agreement.

In some embodiments, the first power generation source 104 may include a power source used to generate a desired reactive power and/or voltage at the POI 102. The first power generation source 104 may include one or more power generation components (for example, power generation component 105, power generation component 106, power generation component 107, and/or power generation component 108, as well as any other number of power generation components). The power generation components may individually be capable of producing a particular reactive power and/or voltage, and a combination of the reactive power and/or voltage produced by the individual power generation components may be provided to the POI 102. In some instances, the first power source 104 may be an offshore substation (OSS), and may be in the form of a wind farm. In such instances, the power generation components may be wind turbines. The first power generation source 104 may be located at a location 125 (for example, a third location) in the system 100.

In some embodiments, the second power generation source 101 may include a power generation source that may also be used to generate a desired reactive power and/or voltage at the POI 102. The second power generation source 101 may serve to supplement the first power generation source 104 when the first power generation source 104 may not be producing a sufficient reactive power and/or voltage to meet the reactive power and/or voltage requirements at the POI 102. That is, the first power generation source 101 may be primarily responsible for generating a sufficient reactive power and/or voltage for the POI 102, and the second power generation source 101 may serve to supplement the first power generation source 104. In some instances, the second power generation source 101 may be an onshore substation (ONS), such as an electrical substation. The second power generation source 101 may be located at a location 130 (which may be, for example, a second location) in the system 100.

In some embodiments, the system 100 may also include any number of other components, such as a shunt reactor, capacitor bank, static var compensator (SVC), static synchronous compensator (STATCOM), synchronous condenser to meet the reactive power and/or voltage requirement. A battery energy storage system (BESS) may also be used which may provide both the real power and reactive power support. A harmonic filer may also be used to meet the harmonic requirement at the POI.

In some embodiments, the controller 109 may be used to perform any of the methods and/or operations described herein (for example, any methods and/or operations described with respect to FIGS. 3-6). For example, the controller 109 may collect measurement data from any of the components of the system 100, such as the first power generation source 103, second power generation source 101, POI 102, transmission line, and/or any other component of the system 100. Types of data that may be received by the controller 109 may be described in more detail with respect to FIG. 2. The controller 109 may also manage any of the components of the system 100. For example, the controller 109 may control the reactive power and/or voltage being produced and/or absorbed by individual power generation components within either the first power generation source 103 and/or second power generation source 101 to ensure that a sufficient reactive power and/or voltage is provided to the POI 102. The controller 109 may also include at least one or more processor(s) 112, memory 114, data storage 116, and one or more power control module(s) 118. The data storage 116 may be used to store any data described herein, such as the measured data described with respect to FIG. 2, or any other data. In some instances, any of the information stored in the data storage may also be stored in memory 114 as well. The one or more power control modules 118 may be configured to perform any of the operations described herein, such as any operations associated with control of various power generation sources used to generate reactive power and/or voltage for a POI 102 (for example, methods and/or operations described with respect to FIGS. 3-6).

Figure 7:
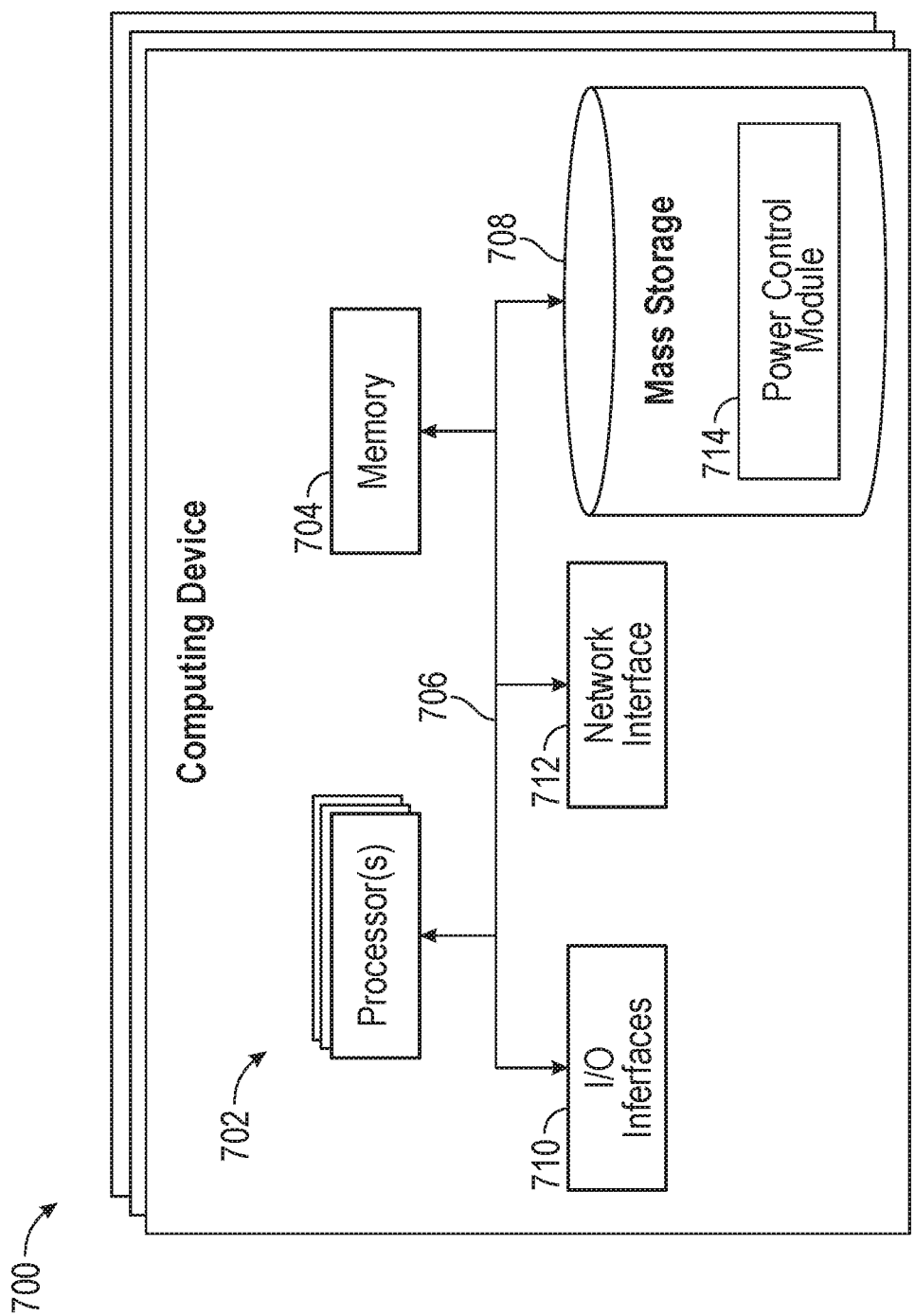
FIG. 7 depicts an example computing device, in accordance with one or more example embodiments of the disclosure.

Additionally, any of the processor(s) 112, memory 114, data storage 116, and or power control modules 118 may be described in more detail with respect to FIG. 7 as well.

Figure 2:
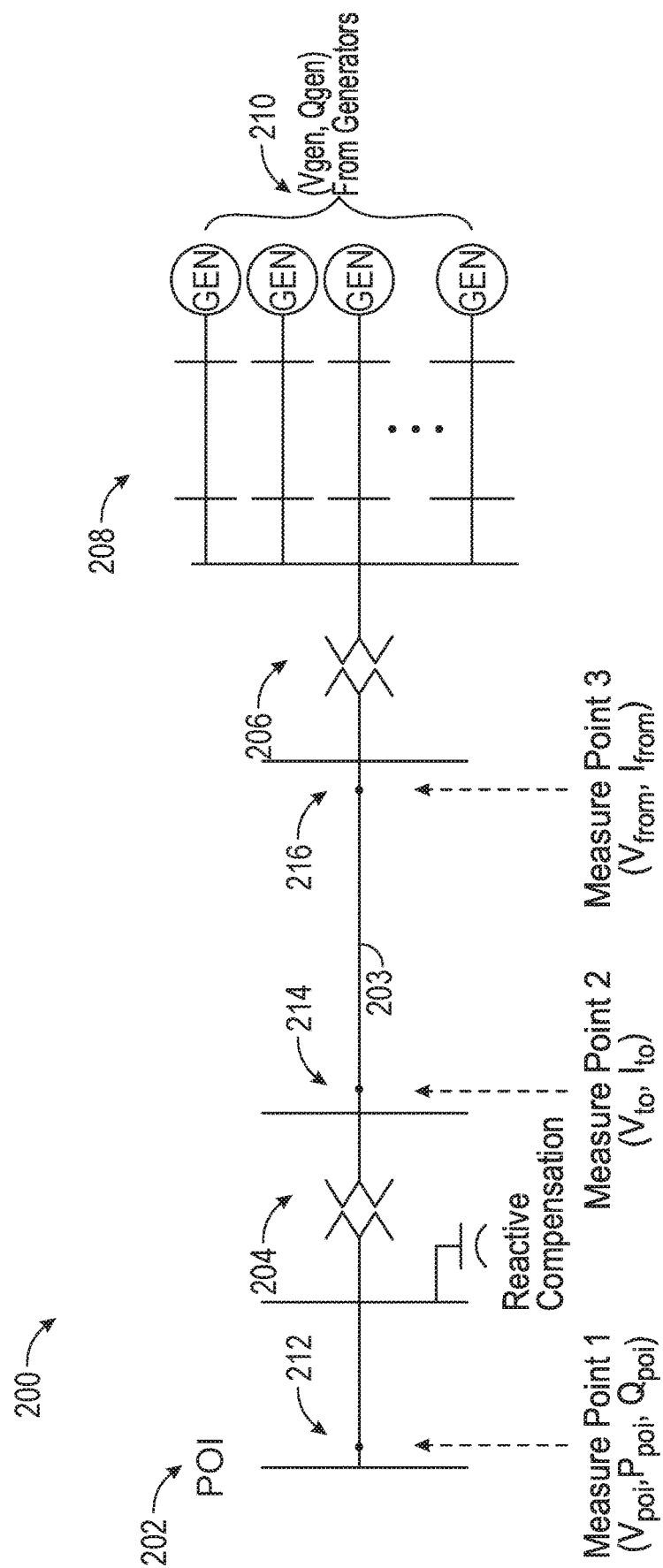
FIG. 2 depicts an example system, in accordance with one or more example embodiments of the disclosure.

In some embodiments, FIG. 2 depicts an example system 200, in accordance with one or more example embodiments of the disclosure. More particularly, FIG. 2 may depict examples of data measurement points in a system as described herein (for example, the system 100 described with respect to FIG. 1, or any other system). In some instances, the system 200 may be similar to system 100 in that it may depict a Point of Interconnection (POI) 202 (which may be the same as POI 102), a transmission line 203 (which may be the same as transmission line 110) and one or more power generation components 208 (which may be the same as 104 to 108). The system 200 may also depict a first transformer 204 and a second transformer 206 that may be located on different portions of the transmission line 203. That is, as mentioned above, the system 200 may include a more simplified version of system 100 to visualize different data measurement points that may be used. In some instances, the different data measurement points as depicted in the system 200 may include at least measurement point 212, measurement point 214, measurement point 216, and/or measurement point 210. Measurement point 212 may include a measurement point at the POI 202. Measurement point 212 may be used to determine data associated with the POI, such as active and/or reactive power injected into the POI ($P_{poi}$ and $Q_{poi}$) or a voltage at POI ($V_{poi}$), for example. Measurement point 214 and measurement point 216 may be measurement points located at different portions of the transmission line 203. For example, measurement point 214 may be located at a first end of the transmission line 203 and measurement point 216 may be located at a second end of the transmission line 203. Measurement point 214 and measurement point 216 may be used to measure data associated with the transmission line 203, such as current and/or voltage values in the transmission line 203 at various points. These measurements from the transmission line 203 may be used, for example, in operations 316, 318, 338, and 340 of the flow chart 300, or any other operations described herein. Measurement point 210 may be used to measure data from the power generation components 208, such as, for example, reactive power output and terminal voltage of the power generation components 208. It should be noted that while the system 200 depicts measurement point 212, measurement point 214, measurement point 216, and measurement point 210, any other measurement points at any location within the system 200 (or any other system) may also be used as well. Additionally, any of the measurements points described herein may similarly measure any other types of data as well.

Illustrative Flow Charts

Figure 3:
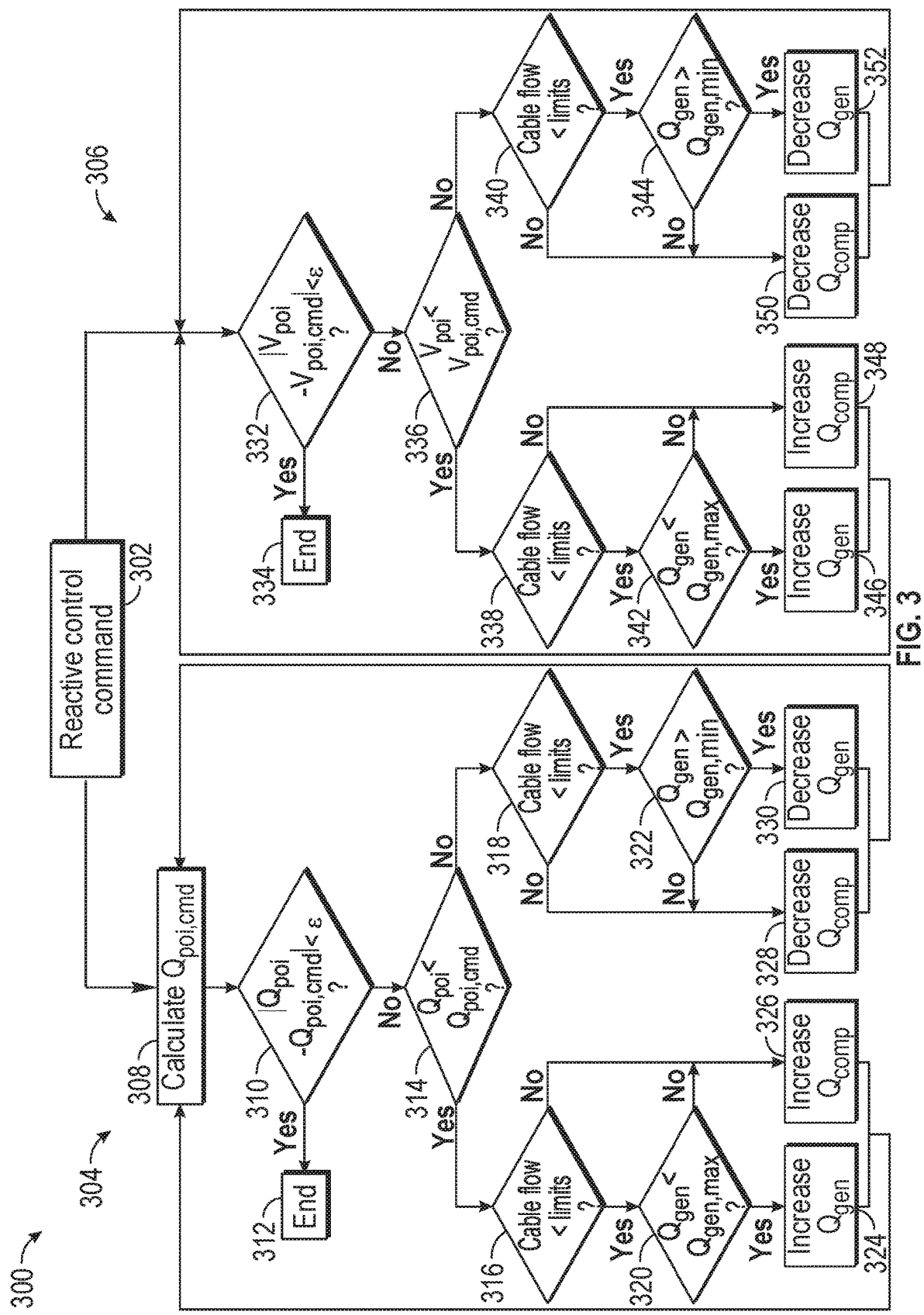
FIG. 3 depicts an example flow chart, in accordance with one or more example embodiments of the disclosure.

FIG. 3 depicts an example flow chart 300, in accordance with one or more example embodiments of the disclosure. In some embodiments, the methods and/or operations described herein may be performed by a controller (the controller may be, for example, system controller 109, computing device 700, or any other controller described herein). The methods and/or operations described with respect to the flow chart 300 may be performed in association with any of the systems described herein, such as the system 100 and/or the system 200, for example. The controller may be located locally to the system or remotely from the system. The controller may also more specifically be integrated into any of the components of any of the systems, or may also be a standalone controller. In some embodiments, the controller may also receive measured data as inputs. The measured data may include, for example, data from measurement point 212, measurement point 214, measurement point 216, and/or measurement point 210 described with respect to FIG. 2 (or any other measurement point). For example, the measured data may include active and reactive power injected into a POI ($P_{poi}$ and $Q_{poi}$) or a voltage at POI ($V_{poi}$), voltage and current at various points along a transmission line, and/or a reactive power output and a terminal voltage of power generation units. The measured data may also include any other types of data as well. This measured data may be used in subsequent methods and/or operations of the flow chart 300 as described herein.

In some embodiments, the flow chart 300 may begin with operation 302 involving receiving a reactive control command from power system operator indicating a voltage control mode or a power factor control mode. If the reactive control command is a power factor command (which may be represented by the variable $Pf_{poi,cmd}$), the flow chart 300 may proceed to branch 304. However, if the reactive control command is a voltage command (which may be represented by the variable $V_{poi,cmd}$), then the flow chart 300 may instead proceed to branch 306. Whether the reactive control command is a power factor command or a voltage command may depend on the power system operator's requirement. For example, some utilities in some locations may require control to be performed using power factor and some locations may require control to be performed using voltage instead. Given this, in some cases (although not depicted in the figure) a determination may be made as to whether a power factor command may be used or a voltage command may be used. However, in other cases, the specific type of command may simply be provided without a determination being made.

In some embodiments, continuing down branch 304, the flow chart 300 may proceed to operation 308, which may involve calculating a reactive power command value based on the power factor command. The reactive power command value may represent an overall reactive power that is desired to be generated by the system, which may be represented in the flow chart 300 as $Q_{poi,cmd}$. Continuing from operation 308, operation 310 may involve a determination if the absolute value of the difference between a measured reactive power (which may be represented as $Q_{poi}$ in the flow chart 300, and may include, for example, a measured reactive power at the POI, such as a reactive power measured at measurement point 212 depicted in FIG. 2) and the reactive power command value (for example, the reactive power command value determined in operation 308) is within an acceptable error band which is typically a small value threshold, ε. If it is determined that the absolute value of the difference between a measured reactive power and the reactive power command value is less than ε, then the flow chart 300 ends at 312. In this case, the reactive power being supplied at the POI may already be sufficiently close to the reactive power command value, so no additional operations may need to be performed. However, if it is determined that the absolute value of the difference between the measured reactive power and the reactive power command value is greater than or equal to ε, then the flow chart may proceed to operation 314. Operation 314 may involve a determination if the measured reactive power is less than the reactive power command value. If it is determined that the measured reactive power is less than the reactive power command value, then the flow chart 300 may proceed to operation 316. If it is determined that the measured reactive power is greater than the reactive power command value, then the flow chart 300 may proceed to operation 318. Operation 316 may involve determining if a current value associated with a transmission line at a third location is less than a threshold current value. The third location may include a location associated with one or more power generation components. For example, the power generation components may be wind turbines and the third location may be a wind farm. In some cases, this may be represented as the offshore substation 104 in FIG. 1 and/or the one or more power generation components 208 in FIG. 2. The threshold current value may refer to a maximum current capability of the transmission line (the threshold current value may also be established below the maximum current capability as well). If it is determined that the current value associated with the transmission line at the third location is less than the threshold current value, then the flow chart 300 may proceed to operation 320. If it is determined that the current value associated with the transmission line at the third location is greater than or equal to the threshold current value, then the flow chart 300 may instead proceed to operation 326.

In some embodiments, operation 320 may involve a determination if the reactive power of one or more power generation components at the third location is less than a maximum reactive power being produced by the one or more power generation components. If it is determined that the reactive power being produced by one or more power generation components at the third location is less than a maximum reactive power of the one or more power generation components, then the flow chart 300 may proceed to operation 324. If it is determined that the reactive power produced by the one or more power generation components at the third location is greater than or equal to the maximum reactive power of the one or more power generation components, then the flow chart may instead proceed to operation 326. At operation 324, the reactive power generated by the one or more power generation components at the third location may be increased. That is, because the one or more power generation components are producing less reactive power than they are capable of producing, the reactive power generated by the one or more power generation components can simply be increased. However, if the flow chart may proceed to operation 326, a reactive power at a second location may be increased. The second location may be an electrical substation that may be used to provide supplemental reactive power in addition to the reactive power being provided by the one or more power generation components at the third location. In some embodiments, the electrical substation may be the same as the onshore substation depicted in FIG. 1. Thus, operation 326 may involve using the reactive power generated by the second location to supplement the reactive power generated by the third location.

Continuing with FIG. 3, if it is determined in operation 314 that the measured reactive power is greater than or equal to the reactive power command value, then the flow chart 300 may proceed to operation 318. The reactive power being greater than or equal to the reactive power command value may mean that the reactive power at the POI is higher than desired and reactive power may need to be absorbed by the system to lower the reactive power at the POI down to a desired level. Operation 318 may involve determining if a current value associated with the transmission line at the third location is less than the threshold current value. If it is determined that the current value associated with the transmission line at the third location is less than the threshold current value, then the flow chart 300 may proceed to operation 322. If it is determined that the current value associated with the transmission line at the third location is greater than or equal to the threshold current value, then the flow chart 300 may proceed to operation 328. Operation 322 may involve a determination if the reactive power of the one or more power generation components at the third location is greater than a minimum reactive power of the one or more power generation components. If it is determined that the reactive power of the one or more power generation components at the third location is greater than a minimum reactive power of the one or more power generation components, then the flow chart 300 may proceed to operation 330. If it is determined that the reactive power of the one or more power generation components at the third location is less than or equal to the minimum reactive power of the one or more power generation components, then the flow chart may proceed to operation 328. If the flow chart 300 may proceed to operation 330, a reactive power generated by the one or more power generation components at the third location may be decreased. However, if the flow chart may proceed to operation 328, a reactive power at a second location may be decreased. Thus, operation 328 may involve using the power generation components at the second location to absorb additional reactive power when the power generation components at the third location are unable to absorb any additional reactive power.

Continuing with FIG. 3 and starting at branch 306, the flow chart 300 may proceed to operation 332, which may involve a determination if the absolute value of the difference between a measured voltage (which may be represented as $V_{poi}$ in the flow chart 300, and may include, for example, a measured voltage at the POI, such as a voltage measured at measurement point 212 depicted in FIG. 2) and the voltage command value is within an acceptable error value threshold, $\varepsilon$. If it is determined that the absolute value of the difference between a measured voltage and the voltage command value is less than $\varepsilon$, then the flow chart 300 ends at 334. In this case, the voltage being supplied at the POI may already be sufficiently close to the voltage command value, so no additional operations may need to be performed. However, if it is determined that the absolute value of the difference between the measured voltage and the voltage command value is greater than or equal to $\varepsilon$, then the flow chart may proceed to operation 336. Operation 336 may involve a determination if the measured voltage is less than the voltage command value. The voltage being greater than the voltage command value may mean that the voltage at the POI is higher than desired and the reactive power may need to be reduced by the system to lower the voltage at the POI down to a desired level. If it is determined that the measured voltage is less than the voltage command value, then the flow chart 300 may proceed to operation 338. If it is determined that the measured voltage is greater than or equal to the voltage command value, then the flow chart 300 may proceed to operation 340. Operation 338 may involve determining if a current value associated with a transmission line at a third location is less than a threshold current value. The third location may include a location associated with one or more power generation components. For example, the power generation components may be wind turbines and the third location may be a wind farm. In some cases, this may be represented as the offshore substation 104 in FIG. 1 and/or the one or more power generation components 208 in FIG. 2. The threshold current value may refer to a maximum current capability of the transmission line (the threshold current value may also be established below the maximum current capability as well). If it is determined that the current value associated with the transmission line at the third location is less than the threshold current value, then the flow chart 300 may proceed to operation 342. If it is determined that the current value associated with the transmission line at the third location is greater than or equal to the threshold current value, then the flow chart 300 may instead proceed to operation 348.

In some embodiments, operation 342 may involve a determination if the reactive power of one or more power generation components at the third location is less than a maximum reactive power being produced by the one or more power generation components. If it is determined that the reactive power being produced by one or more power generation components at the third location is less than a maximum reactive power of the one or more power generation components, then the flow chart 300 may proceed to operation 346. If it is determined that the reactive power produced by the one or more power generation components at the third location is greater than or equal to the maximum reactive power of the one or more power generation components, then the flow chart may instead proceed to operation 348. At operation 346, the reactive power generated by the one or more power generation components at the third location may be increased. That is, because the one or more power generation components are producing less reactive power than they are capable of producing, the reactive power generated by the one or more power generation components may be increased. However, if the flow chart may proceed to operation 348, a reactive power at a second location may be increased. The second location may be an electrical substation that may be used to provide supplemental reactive power in addition to the reactive power being provided by the one or more power generation components at the third location. In some embodiments, the electrical substation may be the same as the onshore substation depicted in FIG. 1. Thus, operation 348 may involve using power generation components at the second location to increase voltage when the power generation components at the third location are unable to increase any additional voltage.

Continuing with FIG. 3, if it is determined in operation 336 that the measured reactive power is greater than or equal to the reactive power command value, then the flow chart 300 may proceed to operation 340. Operation 340 may involve determining if a current value associated with the transmission line at the third location is less than the threshold current value. If it is determined that the current value associated with the transmission line at the third location is less than the threshold current value, then the flow chart 300 may proceed to operation 344. If it is determined that the current value associated with the transmission line at the third location is greater than or equal to the threshold current value, then the flow chart 300 may proceed to operation 350. Operation 344 may involve a determination if the reactive power of the one or more power generation components at the third location is greater than a minimum reactive power of the one or more power generation components. If it is determined that the reactive power of the one or more power generation components at the third location is greater than a minimum reactive power of the one or more power generation components, then the flow chart 300 may proceed to operation 352. If it is determined that the reactive power of the one or more power generation components at the third location is less than or equal to the minimum reactive power of the one or more power generation components, then the flow chart may proceed to operation 350. If the flow chart 300 may proceed to operation 352, a reactive power generated by the one or more power generation components at the third location may be decreased. However, if the flow chart may proceed to operation 350, a reactive power at a second location may be decreased. Thus, operation 350 may involve using the reactive power generated by the second location to supplement the reactive power generated by the third location.

It should be noted that the operations described and depicted in the illustrative flow diagrams of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

One or more operations of the process flows of FIG. 3 may have been described above as being performed by a user device, or more specifically, by one or more program modules, applications, or the like executing on a device. It should be appreciated, however, that any of the operations of process flows of FIG. 3 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Illustrative Methods

Figure 4:
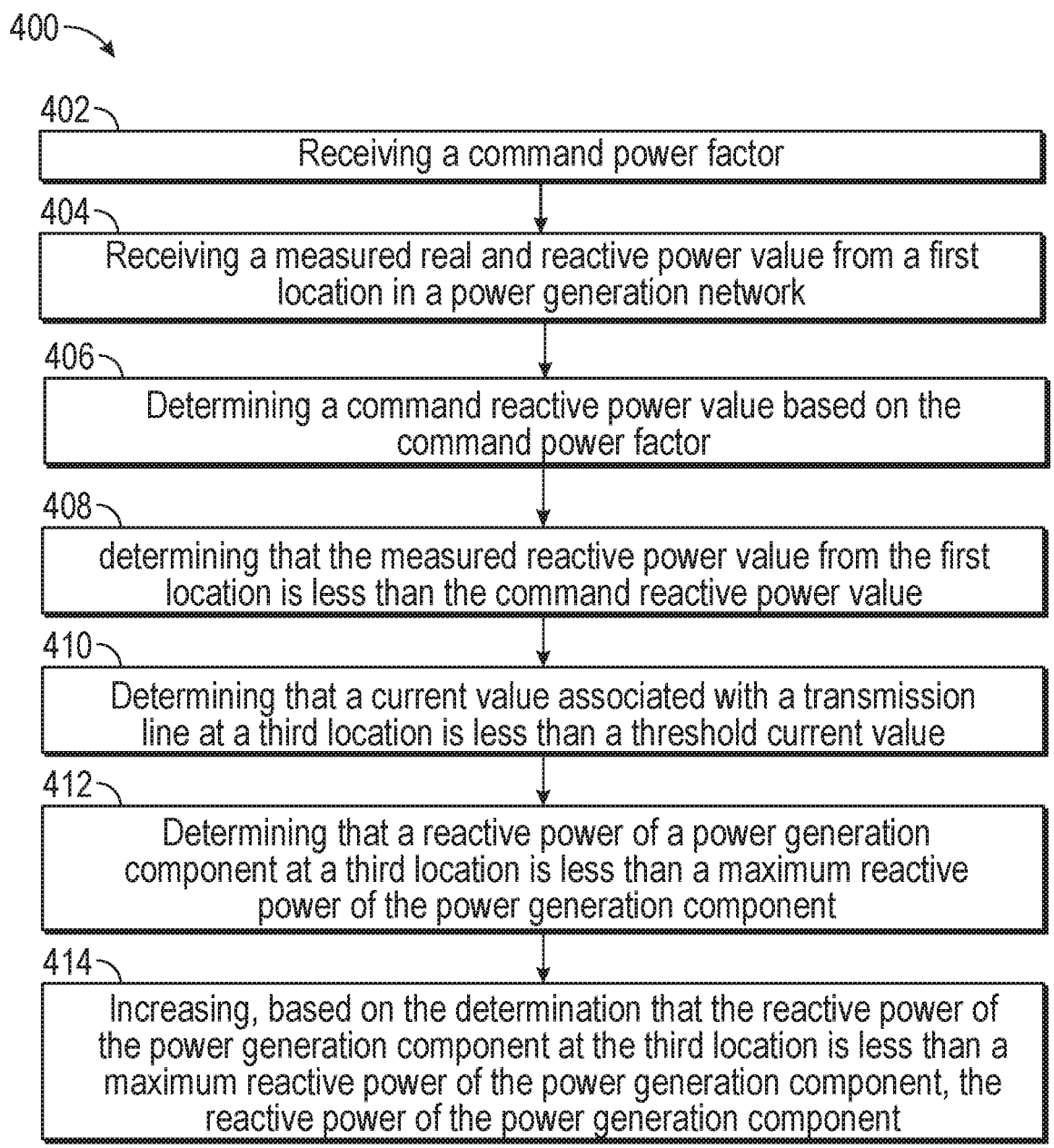
FIG. 4 depicts an example method, in accordance with one or more example embodiments of the disclosure.

FIG. 4 is an example method 400 in accordance with one or more example embodiments of the disclosure. At block 402 of the method 400 in FIG. 4, the method may include receiving a command power factor. At block 404, the method may include receiving a measured real and reactive power value from a first location in a power generation network. At block 406, the method may include determining a command reactive power value based on the command power factor. At block 408, the method may include determining that the measured reactive power value from the first location is less than the command reactive power value. In some instances, the first location may be at a Point of Interconnection (POI) (for example the POI 102 depicted in FIG. 1 or the POI 202 depicted in FIG. 2, or any other POI described herein). At block 410, the method may include determining that a current value associated with a transmission line at the third location is less than a threshold current value. At block 412, the method may include determining that a reactive power of a power generation component at a third location is less than a maximum reactive power of the power generation component. In some instances, the power generation component at the third location may be a wind turbine and the third location may be an offshore substation, such as a wind farm. At block 414, the method may include increasing, based on the determination that the reactive power of the power generation component at the third location is less than a maximum reactive power of the power generation component, the reactive power of the power generation component. That is, if the reactive power currently being produced by one or more power generations components at the third location is below a maximum capability of the one or more power generation components, then the controller may provide a command for the one or more power generation components to produce additional reactive power to provide sufficient reactive power to the POI.

In some embodiments, the method 400 may also include determining that the reactive power of the power generation component at the third location is greater than or equal to the maximum reactive power of the power generation component. The example method may also include increasing, based on the determination that the reactive power of the power generation component at the third location is greater than or equal to than the maximum reactive power of the power generation component, a compensation reactive power at a second location in a power generation network to supplement the reactive power of the power generation component. That is, if the one or more power generation components at the third location are already at their reactive power capacity, then the controller may provide a command to one or more power generation components at the second location (for example, the onshore substation) to increase reactive power to supplement the reactive power produced by the power generation components at the third location. This supplemental reactive power may be used to ensure that the reactive power being provided to the POI is sufficient if the power generation components at the third location are unable to produce such reactive power on their own either due to their own limitations or the limitations of their associated transmission cables.

In some embodiments, the method 400 may also include determining that the measured reactive power value from the first location is greater than the command reactive power value. The method 400 may also include determining that a current value associated with the transmission line at the third location is less than the threshold current value. The method 400 may also include determining that the reactive power of the power generation component at the third location is greater than the minimum reactive power of the power generation component. The method 400 may also include decreasing, based on the determination that the reactive power of the power generation component at the third location is greater than the minimum reactive power of the power generation component, the reactive power of the power generation component. That is, if the reactive power produced by one or more power generation components at the third location is above a minimum value, then the controller may command the one or more power generation components at the third location to reduce reactive power to reduce the amount of reactive power provided to the POI. This may bring the reactive power at the POI down to the command reactive power value that the POI is desired to be at.

In some embodiments, the method 400 may also include determining that the current value associated with the transmission line at the third location is greater than or equal to the threshold current value. The method 400 may also include decreasing, based on the determination that the current value associated with the transmission line at the third location is greater than or equal to a threshold current value, a compensation reactive power at a second location in the power generation network. That is, if the limits of the transmission cables associated with the power generation components at the third location is reached, the controller may command the power generation components at the second location to provide supplemental reactive power to the POI since the transmission cables at the third location may not have the capability to handle any additional reactive power from the power generation components at the third location.

In some embodiments, the method 400 may also include determining that the reactive power of the power generation component at the third location is less than or equal to a minimum reactive power of the power generation component. The method 400 may also include decreasing, based on the determination that the reactive power of the power generation component at the third location is less than or equal to a minimum reactive power of the power generation component, a compensation reactive power at a second location in the power generation network. That is, if the one or more power generation components at the third location are not able to reduce any additional reactive power, the power generation components at the second location may be used to absorb some of the reactive power to bring the reactive power at the POI down to a desired level.

Figure 5:
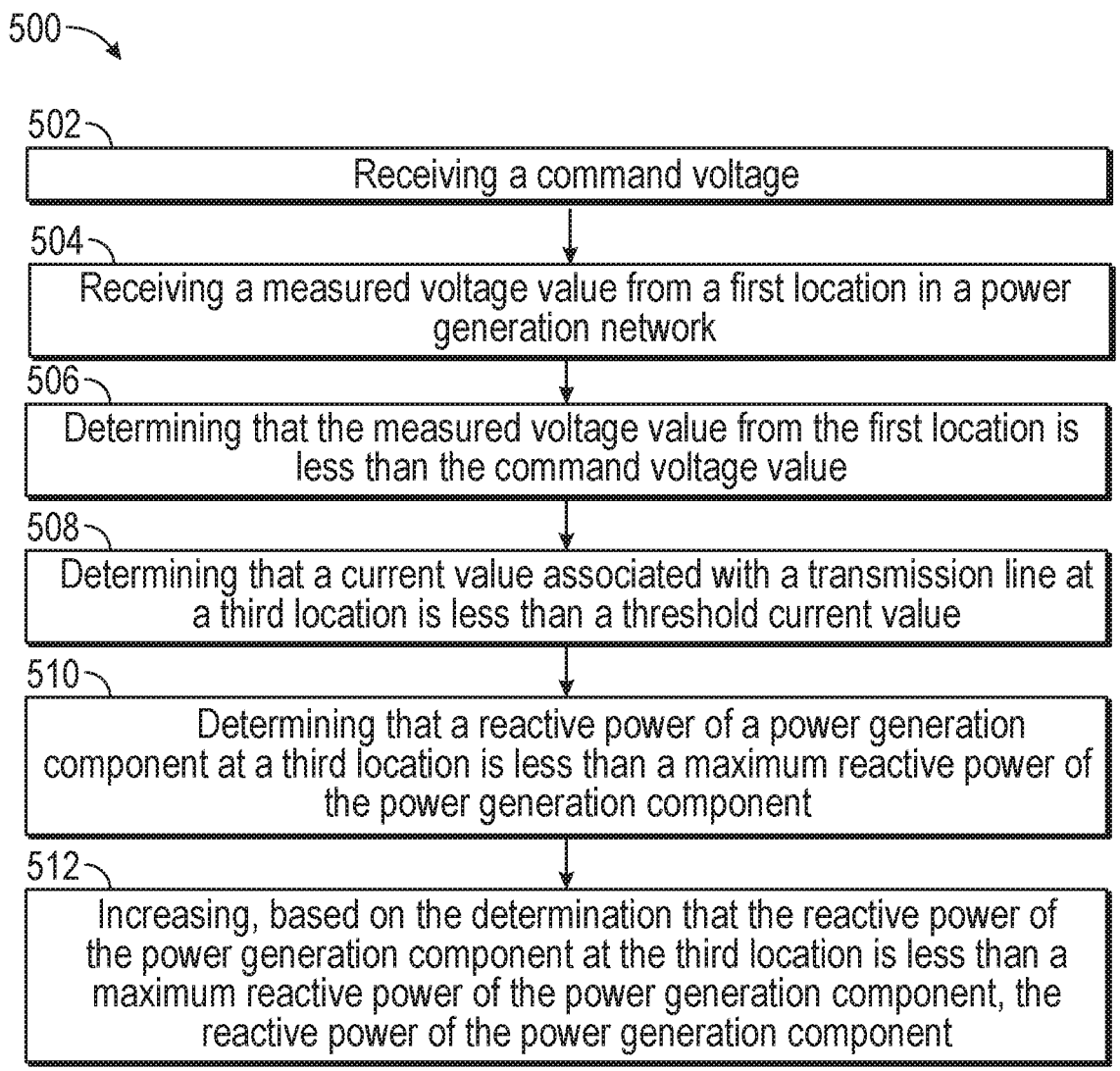
FIG. 5 depicts an example method, in accordance with one or more example embodiments of the disclosure.

FIG. 5 is an example method 500 in accordance with one or more example embodiments of the disclosure. At block 502 of the method 500 in FIG. 5, the method may include receiving a command voltage. Block 504 of the method 500 may involve receiving a measured voltage value from a first location in a power generation network. Block 506 of the method 500 may involve determining that the measured voltage value from the first location is less than the command voltage value. Block 508 of the method 500 may involve determining that a current value associated with a transmission line at the third location is less than a threshold current value. Block 504 of the method 510 may involve determining that a reactive power of a power generation component at a third location is less than a maximum reactive power of the power generation component. Block 512 of the method 500 may involve increasing, based on the determination that the reactive power of the power generation component at the third location is less than a maximum reactive power of the power generation component, the reactive power of the power generation component.

In some embodiments, the method 500 may also include determining that the current value associated with the transmission line at the third location is greater than or equal to the threshold current value. The method 500 may also include increasing, based on the determination that the current value associated with the transmission line at the third location is greater than or equal to the threshold current value, a compensation reactive power at a second location to supplement the reactive power of the power generation component.

In some embodiments, the method 500 may also include determining that the reactive power of the power generation component at the third location is greater than or equal to than the maximum reactive power of the power generation component. The method 500 may also include increasing, based on the determination that the reactive power of the power generation component at the third location is greater than or equal to than the maximum reactive power of the power generation component, a compensation reactive power at a second location to supplement the reactive power of the power generation component.

In some embodiments, the method 500 may also include determining that the measured voltage value from the first location is greater than or equal to the command voltage. The method 500 may also include determining that a current value associated with the transmission line at the third location is less than the threshold current value. The method 500 may also include determining that the reactive power of the power generation component at the third location is greater than the minimum reactive power of the power generation component. The method 500 may also include decreasing, based on the determination that the reactive power of the power generation component at the third location is greater than the minimum reactive power of the power generation component, the reactive power of the power generation component.

In some embodiments, the method 500 may also include determining that the current value associated with the transmission line at the third location is greater than or equal to the threshold current. The method 500 may also include decreasing, based on the determination that the current value associated with the transmission line at the third location is greater than or equal to a threshold current, a compensation reactive power at a second location in the power generation network.

In some embodiments, the method 500 may also include determining that the reactive power of the power generation component at the third location is less than or equal to a maximum reactive power of the power generation component. The method 500 may also include decreasing, based on the determination that the reactive power of the power generation component at the third location is less than or equal to a minimum reactive power of the power generation component, a compensation reactive power at a second location in the power generation network.

Figure 6:
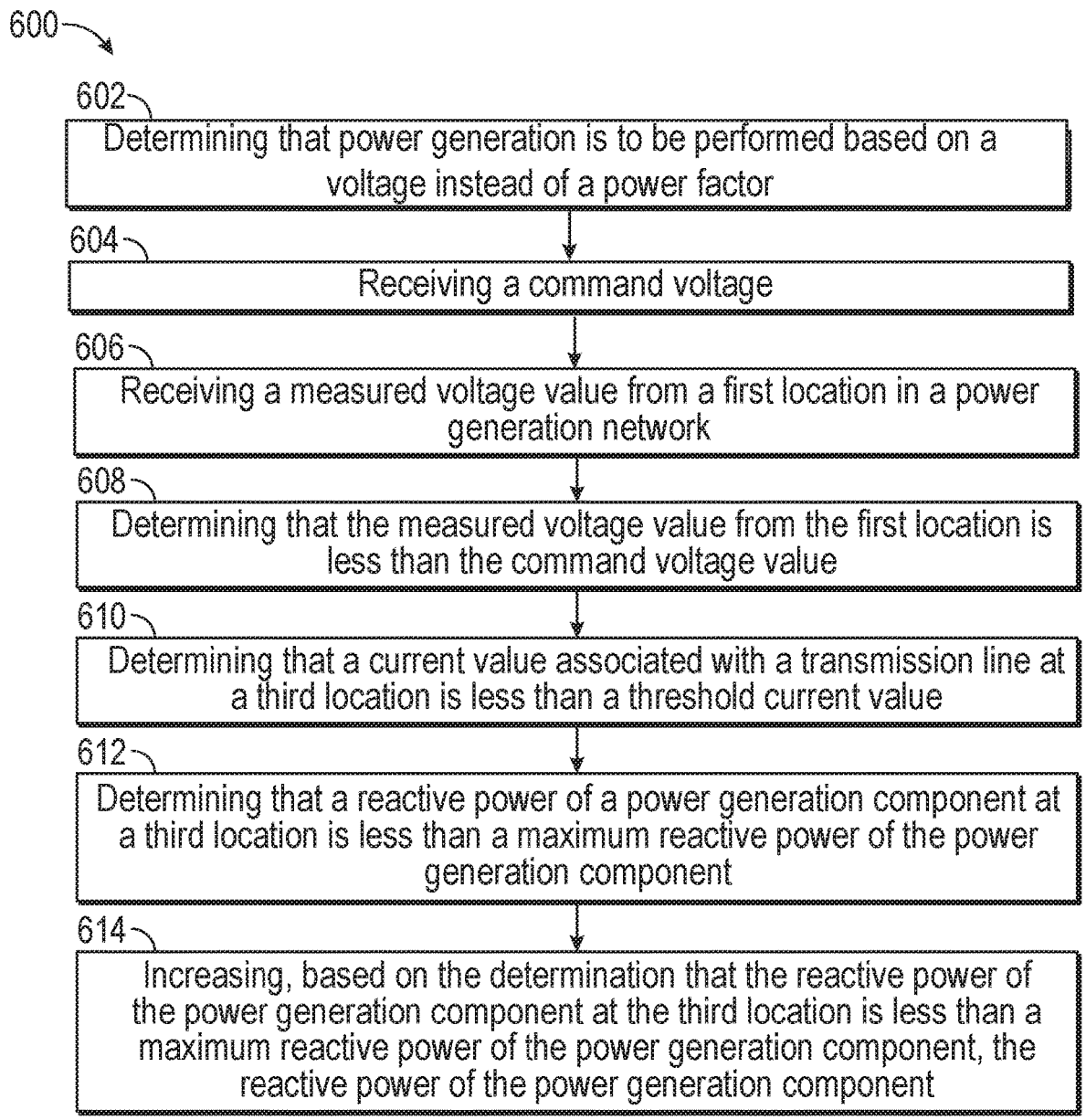
FIG. 6 depicts an example method, in accordance with one or more example embodiments of the disclosure.

FIG. 6 is an example method 600 in accordance with one or more example embodiments of the disclosure. At block 602 of the method 600 in FIG. 6, the method may include determining that power generation is to be performed based on a voltage instead of a power factor. Block 604 of the method 600 may include receiving a command voltage. Block 606 of the method 600 may include receiving a measured voltage value from a first location in a power generation network. Block 608 of the method 600 may include determining that the measured voltage value from the first location is less than the command voltage value. Block 610 of the method 600 may include determining that a current value associated with a transmission line at the third location is less than a threshold current value. Block 612 of the method 600 may include determining that a reactive power of a power generation component at a third location is less than a maximum reactive power of the power generation component. Block 614 of the method 600 may include increasing, based on the determination that the reactive power of the power generation component at the third location is less than a maximum reactive power of the power generation component, the reactive power of the power generation component.

In some embodiments, the method 600 may also include determining that the current value associated with the transmission line at the third location is greater than or equal to the threshold current value. The method 600 may also include increasing, based on the determination that the current value associated with the transmission line at the third location is greater than or equal to the threshold current value, a compensation reactive power at a second location to supplement the reactive power of the power generation component.

In some embodiments, the method 600 may also include determining that the reactive power of the power generation component at the third location is greater than or equal to than the maximum reactive power of the power generation component. The method 600 may also include increasing, based on the determination that the reactive power of the power generation component at the third location is greater than or equal to than the maximum reactive power of the power generation component, a compensation reactive power at a second location to supplement the reactive power of the power generation component.

In some embodiments, the method 600 may also include determining that the measured voltage value from the first location is greater than or equal to the command voltage. The method 600 may also include determining that a current value associated with the transmission line at the third location is less than the threshold current value. The method 600 may also include determining that the reactive power of the power generation component at the third location is greater than the minimum reactive power of the power generation component. The method 600 may also include decreasing, based on the determination that the reactive power of the power generation component at the third location is greater than the minimum reactive power of the power generation component, the reactive power of the power generation component.

In some embodiments, the method 600 may also include determining that the current value associated with the transmission line at the third location is greater than or equal to the threshold current. The method 600 may also include decreasing, based on the determination that the current value associated with the transmission line at the third location is greater than or equal to a threshold current, a compensation reactive power at a second location in the power generation network.

In some embodiments, the method 600 may also include determining that the reactive power of the power generation component at the third location is less than or equal to a maximum reactive power of the power generation component. The method 600 may also include decreasing, based on the determination that the reactive power of the power generation component at the third location is less than or equal to a minimum reactive power of the power generation component, a compensation reactive power at a second location in the power generation network.

The methods and/or operations described and depicted in the illustrative process flows of FIGS. 4-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4-6 may be performed.

One or more operations of the process flows of FIGS. 4-6 may have been described above as being performed by a user device, or more specifically, by one or more program modules, applications, or the like executing on a device. It should be appreciated, however, that any of the operations of process flows of FIGS. 4-6 may be performed, at least in part, in a distributed manner by one or more other devices (for example, locally at the machine, on a remote system, such as a cloud system, or the like), or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Illustrative System Architecture

FIG. 7 illustrates an example computing device 700, in accordance with one or more embodiments of this disclosure. The computing 700 device may be representative of a device that may be used to perform any of the operations described herein (for example, methods and/or operations described with respect to any of the flow charts depicted in FIGS. 3-6, or any other operations associated with anomaly detection). For example, the computing device 700 may be the controller 109 described with respect to FIG. 1, or any other type of device suitable to perform the operations described herein. The computing device 700 may be located locally to a system (such as the system 100 and/or the system 200) or may be located remotely from the system (for example, a remote server). The computing device may also either be integrated into any of the components of the system (for example, individual power generation components or any other component), or may exist as a standalone device. The computing device 700 may include at least one processor 702 that executes instructions that are stored in one or more memory devices (referred to as memory 704). The instructions can be, for instance, instructions for implementing functionality described as being carried out by one or more modules and systems disclosed above or instructions for implementing one or more of the methods disclosed above. The processor(s) 702 can be embodied in, for example, a CPU, multiple CPUs, a GPU, multiple GPUs, a TPU, multiple TPUs, a multi-core processor, a combination thereof, and the like. In some embodiments, the processor(s) 702 can be arranged in a single processing device. In other embodiments, the processor(s) 702 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 702 can access the memory 704 by means of a communication architecture 706 (e.g., a system bus). The communication architecture 706 may be suitable for the particular arrangement (localized or distributed) and type of the processor(s) 702. In some embodiments, the communication architecture 706 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Each computing device 700 also can include mass storage 708 that is accessible by the processor(s) 702 by means of the communication architecture 706. The mass storage 708 can include machine-accessible instructions (e.g., computer-readable instructions and/or computer-executable instructions). In some embodiments, the machine-accessible instructions may be encoded in the mass storage 708 and can be arranged in components that can be built (e.g., linked and compiled) and retained in computer-executable form in the mass storage 708 or in one or more other machine-accessible, non-transitory, storage media included in the computing device 700. Such components can embody, or can constitute, one or many of the various modules disclosed herein. Such modules are illustrated as a power control module 714.

Execution of the power control module 714, individually or in combination, by at least one of the processor(s) 702, can cause the computing device 700 to perform any of the operations described herein (for example, methods and/or operations described with respect to any of the flow charts depicted in FIGS. 3-6, or any other operations associated with reactive power and/or voltage generation by various power generation sources).

Each computing device 700 also can include one or more input/output interface devices 710 (referred to as I/O interface 710) that can permit or otherwise facilitate external devices to communicate with the computing device 700. For instance, the I/O interface 710 may be used to receive and send data and/or instructions from and to an external computing device. The computing device 700 also includes one or more network interface devices 712 (referred to as network interface(s) 712) that can permit or otherwise facilitate functionally coupling the computing device 700 with one or more external devices. Functionally coupling the computing device 700 to an external device can include establishing a wireline connection or a wireless connection between the computing device 700 and the external device. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable, non-transitory, storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory, computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the anomaly detection in machines. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A method comprising:
receiving a command power factor;
receiving a measured real and reactive power value from a first location in a power generation network;
determining a command reactive power value based on the command power factor;
determining that the measured reactive power value from the first location is less than the command reactive power value;
determining that a current value associated with a transmission line at a third location is less than a threshold current value;
determining that a reactive power of a power generation component at a third location is less than a maximum reactive power of the power generation component; and
increasing, based on the determination that the reactive power of the power generation component at the third location is less than a maximum reactive power of the power generation component, the reactive power of the power generation component.

2. The method of claim 1, further comprising:
determining that the current value associated with the transmission line at the third location is greater than or equal to a threshold current value; and
increasing, based on the determination that the current value associated with the transmission line at the third location is greater than or equal to the threshold current value, a compensation reactive power at a second location in the power generation network to supplement the reactive power of the power generation component.

3. The method of claim 1, further comprising:
determining that the reactive power of the power generation component at the third location is greater than or equal to than the maximum reactive power of the power generation component; and
increasing, based on the determination that the reactive power of the power generation component at the third location is greater than or equal to than the maximum reactive power of the power generation component, a compensation reactive power at a second location in a power generation network to supplement the reactive power of the power generation component.

4. The method of claim 1, further comprising:
determining that the measured reactive power value from the first location is greater than or equal to the command reactive power value;
determining that a current value associated with the transmission line at the third location is less than the threshold current value;
determining that the reactive power of the power generation component at the third location is greater than the minimum reactive power of the power generation component; and
decreasing, based on the determination that the reactive power of the power generation component at the third location is greater than the minimum reactive power of the power generation component, the reactive power of the power generation component.

5. The method of claim 1, further comprising:
determining that the current value associated with the transmission line at the third location is greater than or equal to the threshold current value; and
decreasing, based on the determination that the current value associated with the transmission line at the third location is greater than or equal to a threshold current value, a compensation reactive power at a second location in the power generation network.

6. The method of claim 1, further comprising:
determining that the reactive power of the power generation component at the third location is less than or equal to a minimum reactive power of the power generation component; and
decreasing, based on the determination that the reactive power of the power generation component at the third location is less than or equal to a minimum reactive power of the power generation component, a compensation reactive power at a second location in the power generation network.

7. The method of claim 1, wherein the power generation component at the third location comprises a wind turbine.

8. A method comprising:
determining that power generation is to be performed based on a voltage instead of a power factor;
receiving a command voltage;
receiving a measured voltage value from a first location in a power generation network;
determining that the measured voltage value from the first location is less than the command voltage value;
determining that a current value associated with a transmission line at a third location is less than a threshold current value;
determining that a reactive power of a power generation component at a third location is less than a maximum reactive power of the power generation component; and
increasing, based on the determination that the reactive power of the power generation component at the third location is less than a maximum reactive power of the power generation component, the reactive power of the power generation component.

9. The method of claim 8, further comprising
determining that the current value associated with the transmission line at the third location is greater than or equal to the threshold current value; and
increasing, based on the determination that the current value associated with the transmission line at the third location is greater than or equal to the threshold current value, a compensation reactive power at a second location to supplement the reactive power of the power generation component.

10. The method of claim 8, further comprising:
determining that the reactive power of the power generation component at the third location is greater than or equal to than the maximum reactive power of the power generation component; and
increasing, based on the determination that the reactive power of the power generation component at the third location is greater than or equal to than the maximum reactive power of the power generation component, a compensation reactive power at a second location to supplement the reactive power of the power generation component.

11. The method of claim 8, further comprising:
determining that the measured voltage value from the first location is greater than or equal to the command voltage;
determining that a current value associated with the transmission line at the third location is less than the threshold current value;
determining that the reactive power of the power generation component at the third location is greater than the minimum reactive power of the power generation component; and
decreasing, based on the determination that the reactive power of the power generation component at the third location is greater than the minimum reactive power of the power generation component, the reactive power of the power generation component.

12. The method of claim 8, further comprising:
determining that the current value associated with the transmission line at the third location is greater than or equal to the threshold current; and
decreasing, based on the determination that the current value associated with the transmission line at the third location is greater than or equal to a threshold current, a compensation reactive power at a second location in the power generation network.

13. The method of claim 8, further comprising;
determining that the reactive power of the power generation component at the third location is less than or equal to a maximum reactive power of the power generation component; and
decreasing, based on the determination that the reactive power of the power generation component at the third location is less than or equal to a minimum reactive power of the power generation component, a compensation reactive power at a second location in the power generation network.

14. The method of claim 8, wherein the power generation component at the third location comprises a wind turbine.

15. A method comprising:
receiving a command voltage;
receiving a measured voltage value from a first location in a power generation network;
determining that the measured voltage value from the first location is less than the command voltage value;
determining that a current value associated with a transmission line at a third location is less than a threshold current value;
determining that a reactive power of a power generation component at a third location is less than a maximum reactive power of the power generation component; and
increasing, based on the determination that the reactive power of the power generation component at the third location is less than a maximum reactive power of the power generation component, the reactive power of the power generation component.

16. The method of claim 15, further comprising
determining that the current value associated with the transmission line at the third location is greater than or equal to the threshold current value; and
increasing, based on the determination that the current value associated with the transmission line at the third location is greater than or equal to the threshold current value, a compensation reactive power at a second location to supplement the reactive power of the power generation component.

17. The method of claim 15, further comprising:
determining that the reactive power of the power generation component at the third location is greater than or equal to than the maximum reactive power of the power generation component; and
increasing, based on the determination that the reactive power of the power generation component at the third location is greater than or equal to than the maximum reactive power of the power generation component, a compensation reactive power at a second location to supplement the reactive power of the power generation component.

18. The method of claim 15, further comprising:
determining that the measured voltage value from the first location is greater than or equal to the command voltage;
determining that a current value associated with the transmission line at the third location is less than the threshold current value;
determining that the reactive power of the power generation component at the third location is greater than the minimum reactive power of the power generation component; and
decreasing, based on the determination that the reactive power of the power generation component at the third location is greater than the minimum reactive power of the power generation component, the reactive power of the power generation component.

19. The method of claim 15, further comprising:
determining that the current value associated with the transmission line at the third location is greater than or equal to the threshold current; and
decreasing, based on the determination that the current value associated with the transmission line at the third location is greater than or equal to a threshold current, a compensation reactive power at a second location in the power generation network.

20. The method of claim 15, further comprising;
determining that the reactive power of the power generation component at the third location is less than or equal to a maximum reactive power of the power generation component; and
decreasing, based on the determination that the reactive power of the power generation component at the third location is less than or equal to a minimum reactive power of the power generation component, a compensation reactive power at a second location in the power generation network.

\* \* \* \* \*